US009731382B2

United States Patent
Klein et al.

(10) Patent No.: US 9,731,382 B2
(45) Date of Patent: Aug. 15, 2017

(54) METHOD FOR PRODUCING A BODY PART OF A VEHICLE AND BODY PART OF A VEHICLE

(71) Applicants: Thomas Klein, Mainz (DE); Dirk Lungershausen, Wiesbaden (DE); Juergen Hulbert, Eltville (DE)

(72) Inventors: Thomas Klein, Mainz (DE); Dirk Lungershausen, Wiesbaden (DE); Juergen Hulbert, Eltville (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 205 days.

(21) Appl. No.: 14/340,239

(22) Filed: Jul. 24, 2014

(65) Prior Publication Data

US 2014/0333095 A1 Nov. 13, 2014

Related U.S. Application Data

(63) Continuation of application No. 12/753,014, filed on Apr. 1, 2010, now Pat. No. 8,898,906.

(30) Foreign Application Priority Data

Apr. 3, 2009 (DE) .................. 10 2009 016 220

(51) Int. Cl.
*B23K 33/00* (2006.01)
*B23K 26/26* (2014.01)
(Continued)

(52) U.S. Cl.
CPC ............ *B23K 33/008* (2013.01); *B23K 26/26* (2013.01); *B62D 25/04* (2013.01); *B23K 2201/006* (2013.01); *Y10T 29/49622* (2015.01)

(58) Field of Classification Search
CPC .... B23K 33/008; B60H 1/243; Y10T 403/478
See application file for complete search history.

(56) References Cited

U.S. PATENT DOCUMENTS 4,470,717 A * 9/1984 Bruhnke .............. B23K 33/008
219/91.2
4,634,173 A * 1/1987 Aonuma ................ B62D 25/06
296/203.04

(Continued)

FOREIGN PATENT DOCUMENTS

DE 19627913 A1 * 2/1997 ......... B23K 15/0046
DE 102004049115 A1 4/2006
(Continued)

OTHER PUBLICATIONS

Translation of JP-2003-54445.*

*Primary Examiner* — Jacob Cigna
(74) *Attorney, Agent, or Firm* — Lorenz & Kopf LLP (57) ABSTRACT

A method is provided for producing a body part of a vehicle. The method includes, but is not limited to providing a first profile part with at least one first welding flange and with a first opening as well as a second profile part with at least one third welding flange. The welding flange is at least partially arranged on the third welding flange subject to the formation of an at least partially closed form of the body part. The first welding flange and the third welding flange are arranged within the at least partially closed form. A first laser beam is guided through the first opening onto the first welding flange subject to the formation of at least one first laser weld seam between the first welding flange and the third welding flange.

6 Claims, 5 Drawing Sheets

(51) Int. Cl.
*B62D 25/04* (2006.01)
*B23K 101/00* (2006.01)

(56) References Cited

U.S. PATENT DOCUMENTS

| | | | | |
|---|---|---|---|---|
| 4,654,505 A | * | 3/1987 | Sciaky | B23K 26/067 |
| | | | | 219/121.63 |
| 5,332,281 A | * | 7/1994 | Janotik | B62D 21/02 |
| | | | | 296/203.03 |
| 5,451,742 A | * | 9/1995 | Nishio | B23K 26/22 |
| | | | | 219/121.64 |
| 5,729,463 A | * | 3/1998 | Koenig | B23K 11/11 |
| | | | | 700/98 |
| 5,791,043 A | | 8/1998 | Okabe et al. | |
| 6,770,839 B2 | | 8/2004 | Mangiarino et al. | |
| 7,229,113 B2 | | 6/2007 | Lendway, IV et al. | |
| 7,547,063 B2 | * | 6/2009 | Stojkovic | B62D 25/04 |
| | | | | 296/193.05 |
| 7,857,377 B2 | * | 12/2010 | Chen | B62D 25/025 |
| | | | | 296/203.03 |
| 7,963,019 B2 | * | 6/2011 | Reed | B62D 25/04 |
| | | | | 29/525.14 |
| 8,282,168 B2 | | 10/2012 | Kienke et al. | |
| 2006/0055209 A1 | * | 3/2006 | Hoshino | B62D 25/06 |
| | | | | 296/203.03 |
| 2006/0087153 A1 | | 4/2006 | Lendway, IV et al. | |
| 2008/0052908 A1 | * | 3/2008 | Reed | B62D 25/04 |
| | | | | 29/897.2 |
| 2008/0111398 A1 | * | 5/2008 | Stojkovic | B62D 27/023 |
| | | | | 296/203.01 |
| 2010/0086803 A1 | * | 4/2010 | Patberg | B21C 37/08 |
| | | | | 428/595 |
| 2015/0209909 A1 | * | 7/2015 | Shimada | B23K 26/3206 |
| | | | | 403/271 |

FOREIGN PATENT DOCUMENTS

| | | | | |
|---|---|---|---|---|
| DE | 102006026409 A1 | | 12/2007 | |
| EP | 2030871 A2 | * | 3/2009 | ............ B23K 26/20 |
| IT | EP 0453698 A1 | * | 10/1991 | ............ B23K 26/06 |
| JP | 59092189 A | | 5/1984 | |
| JP | 2003054445 A | * | 2/2003 | |
| JP | 2003191074 A | | 7/2003 | |
| JP | WO 2014083617 A1 | * | 6/2014 | ........ B23K 26/3206 |

* cited by examiner

METHOD FOR PRODUCING A BODY PART OF A VEHICLE AND BODY PART OF A VEHICLE

CROSS-REFERENCE TO RELATED APPLICATION

This application claims priority to U.S. application Ser. No. 12/753,014, filed Apr. 4, 2010 and German Patent Application No. 102009016220.8, filed Apr. 3, 2009, which are incorporated herein by reference in their entirety.

TECHNICAL FIELD

The invention relates to a method for producing a body part of a vehicle as well as a body part of a vehicle.

BACKGROUND

From JP 2003054445 A, a body part with at least one welding flange located inside is known, upon whose production two profile parts are joined together through a laser welding method. There, a laser beam is guided on an outer lateral surface along the at least one welding flange.

At least one object of the invention is to state a method for producing a body part of a vehicle which makes possible a reliable welded connection, wherein additionally a weight reduction of the body part is to be achieved. In addition, other objects, desirable features, and characteristics will become apparent from the subsequent summary and detailed description, and the appended claims, taken in conjunction with the accompanying drawings and this background.

SUMMARY

According to an embodiment of the invention, a method for producing a body part of a vehicle is stated, wherein the method comprises the following steps. A first profile part with at least one first welding flange and with a first opening as well as a second profile part with at least a third welding flange are provided. The first welding flange is at least partially arranged on the third welding flange subject to the formation of an at least partially closed form of the body part. There, the first welding flange and the third welding flange are arranged within the at least partially closed form. A first laser beam is guided through the first opening onto the first welding flange subject to the formation of at least one first laser weld seam between the first welding flange and the third welding flange.

The method has the advantage that it guarantees a secure connection of the first and the second profile part through the first laser weld seam. In addition, this method, compared with conventional welding techniques such as for example electrode welding, is almost maintenance-free and additionally also faster, as a result of which production costs are reduced. In addition, the widths of the welding flange or the welding flanges can be reduced which leads to a weight reduction of the body part and, connected with this, lower fuel consumption as well as lower exhaust gas emission, such as for example carbon dioxide. In addition to this, profile parts whose welding flanges have different thicknesses and/or wherein the respective welding flange has a variable thickness, for example jumps in thickness, can be welded together through the method according to the invention. This is an advantage especially when tailored blanks are employed as profile parts. There, the variable thickness can be taken into account through a corresponding variation of the laser output.

In an embodiment of the method according to the invention the first profile part comprises at least one additional opening.

Through the at least one additional opening the first laser beam in a configuration of the method is guided onto the first welding flange subject to the formation of at least one second laser weld seam between the first welding flange and the third welding flange. This additionally increases the reliability of the welded connection, since in addition to the first laser weld seam a second laser weld seam is created.

Here, the first laser beam is preferably operated pulsed and, between the guiding through the first opening and the guiding through the at least one additional opening, interrupted.

In addition to this, the first laser beam, during the guiding through the first opening and/or the guiding through the at least one additional opening, can be interrupted.

An interruption of the laser beam has the advantage that as a result the heating of the welding flange or the welding flanges connected with the welding process can be reduced. This in turn leads to quicker cooling down of the welding flange or the welding flanges and thus an altogether reduced method duration.

In an alternative embodiment of the method according to the invention a second laser beam is guided through the at least one additional opening onto the first welding flange subject to the formation of at least one second laser weld seam between the first welding flange and the third welding flange. The first laser beam and the second laser beam can be guided simultaneously. This leads to a further reduction of the production duration.

Preferably the at least one first laser weld seam and the at least one second laser weld seam are formed overlapping each other. This embodiment has the advantage of further increased reliability of the welded connection and thus increased stability of the body part, which more preferably in accident situations, improves the protection of the vehicle occupants. In addition, a continuous or overlapping laser weld seam protects the body part from entering water, for example rain water or dirt and thus makes possible sealing of the body part without additional sealing compound, for example in form of a sealing rubber, being required. This leads to a reduction of the required components and a weight reduction, as a result of which the production costs, the fuel consumption and the exhaust gas emission can be lowered.

In a further embodiment of the method the first profile part comprises at least one second welding flange and the second profile part at least one fourth welding flange. The second welding flange and the fourth welding flange are arranged within the at least partially closed form. Here, the second welding flange is arranged at least partially on the fourth welding flange. A third laser beam is guided through the at least one additional opening onto the second welding flange subject to the formation of at least one third laser weld seam between the second welding flange and the fourth welding flange. Through the provision of the second and the fourth welding flange and the formation of the third laser weld seam between the second welding flange and the fourth welding flange the connection of the two profile parts can be additionally improved. Preferably the second and the fourth welding flange are located within the at least partially closed form on an opposite side with respect to the first and third welding flange.

In addition, the first welding flange and the second welding flange are preferably located in an end region of the first profile part as well as the third welding flange and the fourth welding flange in an end region of the second profile part.

The third laser beam can be simultaneously guided with the first laser beam and/or the second laser beam.

In an embodiment the first laser beam and/or the second laser beam are guided in a straight line onto the first welding flange and/or the third laser beam is guided in a straight line onto the second welding flange. This embodiment has the advantage of a simple method sequence and thus a lower number of components required to carry out the method.

In a further embodiment the first laser beam and/or the second laser beam are guided onto the first welding flange by means of a deflection device and/or the third laser beam is guided onto the second welding flange by means of a deflection device. Although this increases the quantity of the components required to carry out the method, the length of the respective laser weld seams with identical size of the openings can however be increased or the width of the openings with identical length of the laser weld seams can be reduced accordingly as a result.

Preferably the at least one deflection device comprises a mirror. Here, the at least one deflection device can be arranged within the at least partially closed form.

In an embodiment of the method the first welding flange and the third welding flange are deformed before the arranging of the first welding flange on the third welding flange subject to the formation of a U-shaped profile each. Because of this, a contact surface can be reliably provided between the two welding flanges. The corresponding laser beams are subsequently guided in the region of this contact surface, as a result of which a further improved welded connection between the first welding flange and the third welding flange is made possible.

In addition to this, the second welding flange and the fourth welding flange before the arranging of the second welding flange on the fourth welding flange can be deformed subject to the formation of a U-shaped profile each, as a result of which a contact surface can likewise be reliably provided between the two welding flanges.

The position of the first opening and the at least one additional opening in the first profile part can be determined by means of a method which establishes the strength of the body part.

In addition, the first opening and the at least one additional opening can also be produced in the first profile part only following the arranging of the first welding flange on the third welding flange.

In a further configuration of the method the second profile part has at least one opening through which a fourth laser beam is guided onto the third welding flange subject to the formation of at least one fourth laser weld seam between the first welding flange and the third welding flange. In addition to this, the second profile part can have at least one additional opening through which a fifth laser beam is guided onto the fourth welding flange subject to the formation of at least a fifth laser weld seam between the second welding flange and the fourth welding flange.

The first laser weld seam and/or the additional laser weld seams, more preferably the second, third and/or fourth laser weld seam, can be embodied in a straight line.

It is also possible that the first laser weld seam and/or the additional laser weld seams, more preferably the second, third and/or the fourth laser weld seam are embodied curved or bent.

Through a suitable selection of the form of the laser weld seams the energy input in the respective welding flanges or the respective profile parts connected with the welding process can be advantageously reduced or input in such a controlled manner that the heating of the welding flanges or profile parts takes place preferably homogenously. Because of this, temperature-dependent mechanical stresses within the welding flanges are reduced or buckling of the welding flanges or of parts of the welding flanges connected with the heating is reduced. This lowers the risk of the development of distortions during the subsequent cooling-down of the welding flanges or of the profile parts, more preferably since the cooling-down takes place more homogenously or distributed more evenly. Here it is also conceivable that the respective laser beams are guided in such a manner that they partially do not form any laser weld seams but merely heat the welding flanges concerned locally in order to achieve as homogenous a temperature distribution within the welding flanges as possible.

The embodiments of invention additionally relate to a body part of a vehicle, wherein the body part is produced through one of the methods described above.

A corresponding body part thus comprises at least one first profile part and one second profile part. The first profile part comprises at least one first welding flange and the second profile part comprises at least one third welding flange which is at least partially arranged on the first welding flange. The body part has an at least partially closed form and the first welding flange and the third welding flange are arranged within the at least partially closed form. At least the first profile part comprises at least one opening and the first welding flange and the third welding flange are connected to each other through at least one first laser weld seam.

As already explained above, such a body part has a reduced weight which has an advantageous effect on the fuel consumption and the exhaust gas emission.

Here, the vehicle can be a motor vehicle and the first profile part and/or the second profile part a part of an A-pillar of the motor vehicle. This makes possible integration of the at least partially closed body part, for example in form of an A-pillar half shell, in a side wall of the motor vehicle, as a result of which the joining and tool costs are lowered and the production expenditure reduced.

In an alternative embodiment the first profile part and/or the second profile part is a part of a C or D-pillar of the motor vehicle.

The method and the body part cannot only be provided in motor vehicle production but for example also in the field of ship or aircraft construction. In general, the method and the body part are particularly suitable for light-weight construction.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
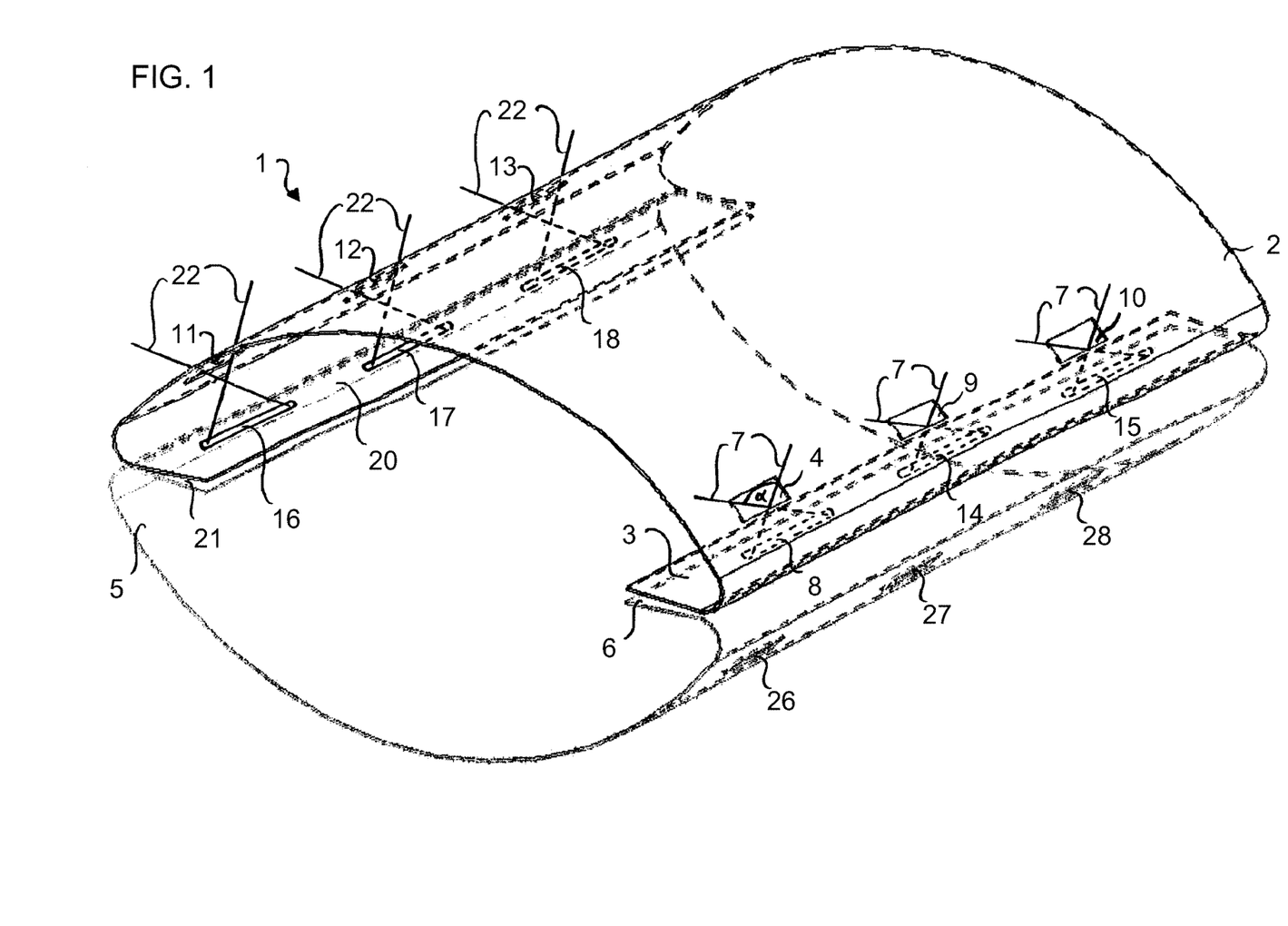
FIG. 1 shows a method for producing a body part of a vehicle according to a first embodiment of the invention.

FIG. 1 shows a method for producing a body part 1 of a vehicle according to a first embodiment of the invention.

To produce the body part 1 a first profile part 2 and a second profile part 5 are provided. The first profile part 2 comprises a first opening 4 as well as additional openings, 9, 10, 11, 12 and 13. In addition, the first profile part 2 comprises a first welding flange 3 as well as a second welding flange 20. The second profile part 5 comprises a third welding flange 6 and a fourth welding flange 21.

The first welding flange 3 is arranged on the third welding flange 6. In addition, the second welding flange 20 is arranged on the fourth welding flange 21. In the embodiment shown in FIG. 1 the first welding flange 3 is arranged completely on the third welding flange 6 and the second welding flange 20 is arranged completely on the fourth welding flange 21. However, it is also possible to arrange the first welding flange 3 only partially on the third welding flange 6 and/or the second welding flange 20 only partially on the fourth welding flange 21.

The first profile part 2 and the second profile part 5 are arranged in such a manner that a partially closed form of the body part 1 is formed. The first welding flange 3, the second welding flange 20, the third welding flange 6 as well as the fourth welding flange 21 are arranged within the at least partially closed form.

A first laser beam 7 is guided through the first opening 4 of the first profile part 2 as shown in FIG. 1. Here, the first laser beam 7 sweeps an angle α and a first laser weld seam 8 is formed between the first welding flange 3 and the third welding flange 6.

Following this, the first laser beam 7 is guided through the additional opening 9 subject to the formation of a second laser weld seam 14 between the first welding flange 3 and the third welding flange 6. After this, the first laser beam 7 is guided through the opening 10 subject to the formation of a laser weld seam 15 between the first welding flange 3 and the third welding flange 6.

The first laser beam 7 is thus successively guided through the first opening 4, the additional opening 9 and the opening 10. The first laser beam 7 is operated in a pulsed manner and between the guiding through the first opening 4 and the guiding through the additional opening 9 as well as the opening 10, interrupted.

In the embodiment shown, the first laser weld seam 8 as well as the second laser weld seam 14 and the laser weld seam 15 are arranged separately or offset from one another. This makes possible reduced energy input in the welding flanges 3 and 6 during the welding operation, a result of which temperature-dependent mechanical stresses within the mentioned welding flanges can be controlled or reduced. However, it is also possible that the first laser weld seam 8 and the second laser weld seam 14 as well as the laser weld seam 15 are embodied overlapping one another. In this case, laser weld seams 8, 14 and 15 embodied overlapping one another, protect the body part 1 against the entry of water, for example, of rain water, or dirt and make possible sealing of the body part 1 without additional sealing compound, for example in form of a sealing rubber, being required.

A third laser beam 22 is guided through the opening 11 onto the second welding flange 20 subject to the formation of a third laser weld seam 16 between the second welding flange 20 and the fourth welding flange 21. Following this, the third laser beam 22 is guided through the opening 12 onto the second welding flange 20 subject to the formation of a laser weld seam 17 between the second welding flange 20 and the fourth welding flange 21. Following this, the third laser beam 22 is guided through the opening 13 subject to the formation of a laser weld seam 18 between the second welding flange 20 and the fourth welding flange 21.

Like the first laser beam 7 before, the third laser beam 22 is likewise operated in a pulsed manner and between the guiding through the opening 11 and the opening 12 as well as through the opening 13, interrupted.

In the embodiment shown, the third laser weld seam 16 and the laser weld 17 as well as the laser weld seam 18 are arranged separated from one another. However, it is also possible that the third laser weld seam 16 as well as the laser weld 17 and the laser weld seam 18 are formed overlapping one another.

The first laser beam 7 and the third laser beam 22 can be generated by the same laser source, wherein initially the first laser beam 7 is guided through the first opening 4 and the additional opening 9 and the opening 10 and following this the third laser beam 22 is guided through the opening 11 and the openings 12 and 13. It is however also possible that the first laser beam 7 is generated by a first laser source and the third laser beam 22 by a third laser source and are each guided at the same time.

The first laser beam 7 in the embodiment shown is guided in a straight line onto the first welding flange 3. In addition, the third laser beam 22 is guided in a straight line onto the second welding flange. In an alternative embodiment the mentioned laser beams are guided onto the corresponding welding flanges by means of at least one deflection device. The deflection device can comprise a mirror and be arranged within the at least partially closed form.

The first laser weld seam 8, the second laser weld seam 14 and the third laser weld seam 16, as well as the additional weld seams 15, 17 and 18 are formed in a straight line in the embodiment shown. In an alternative embodiment of the method, the respective laser beams can also be guided onto the first welding flange 3 and the second welding flange 20 in such a manner that the corresponding laser weld seams have a bent or curved form.

The second profile part 5 in the embodiment shown in FIG. 1 likewise comprises openings 26, 27 and 28. Through at least one of the openings 26, 27 and 28, an additional laser beam not shown in FIG. 1 for the sake of clarity can be guided onto the third welding flange 6 subject to the formation of at least one additional laser weld seam between the first welding flange 3 and the third welding flange 6.

In FIG. 1, the first laser beam 7 and the third laser beam 22 are shown more than once to simplify representation. It is, however, the same laser beam 7 which, as explained, is successively guided through the first opening 4 as well as the additional opening 9 and the opening 10 or the same laser beam 22 which is successively guided through the opening 11 as well as the opening 12 and the opening 13.

Figure 2:
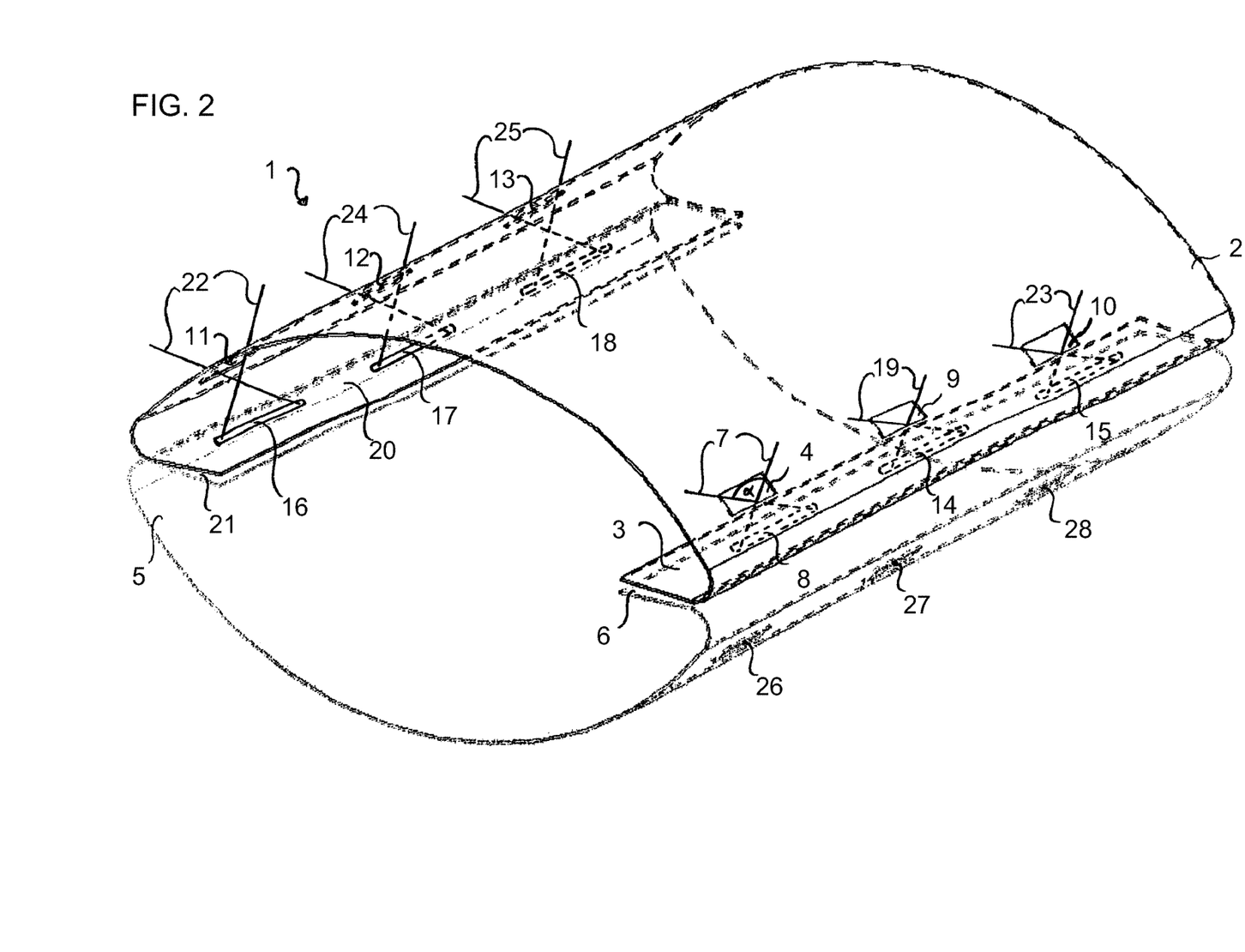
FIG. 2 shows a method for producing a body part of a vehicle according to a second embodiment of the invention.

FIG. 2 shows a method for producing a body part 1 of a vehicle according to a second embodiment of the invention. Components with the same functions as in FIG. 1 are marked with the same reference characters and are not explained in more detail in the following.

In this embodiment of the invention the first laser beam 7 in turn is guided through the first opening 4 onto the first welding flange 3 subject to the formation of the first laser weld seam 8 between the first welding flange 3 and the third welding flange 6. At the same time this is happening, a second laser beam 19 is guided through the additional opening 9 onto the first welding flange 3 subject to the formation of a second laser weld seam 14 between the first welding flange 3 and the third welding flange 6. Also at the same time, a laser beam 23 is guided through the opening 10 onto the first welding flange, wherein a laser weld seam 15 forms between the first welding flange 3 and the third welding flange 6.

In the embodiment shown, the first laser weld seam 8 as well as the second laser weld seam 14 and the laser weld seam 15 are arranged separated or offset from one another. This allows reduced energy input in the welding flanges 3 and 6 during the welding operation, as a result of which temperature-dependent mechanical stresses within the mentioned welding flanges can be controlled or reduced. However, it is also possible to embody the first laser weld seam 8 as well as the second laser weld seam 14 and the laser weld seam 15 overlapping one another. In this case, laser weld seams 8, 14 and 15 formed in a manner overlapping one another protect the body part 1 against entry of water, for example rain water, or dirt and make possible sealing of the body part 1 without additional sealing compound for example in form of a sealing rubber being required.

In addition to this, the third laser beam 22 is guided through the opening 11 onto the second welding flange 20 subject to the formation of the third laser weld seam 16 between the second welding flange 20 and the fourth welding flange 21. At the same time this is happening, a laser beam 24 is guided through the opening 12 and a laser beam 25 is guided through the opening 13 onto the second welding flange 20 subject to the formation of a laser weld seam 17 and 18 between the second welding flange 20 and the fourth welding flange 21.

The first laser beam 7 as well as the second laser beam 19 and the laser beam 23 in this case can be guided at the same time as the third laser beam 22 and the laser beams 24 and 25.

In the embodiments shown in FIG. 2 the third laser weld seam 16 is arranged separated from the laser weld seam 17 and the laser weld seam 18. It is however also possible to embody the third laser weld seam 16 and the laser weld seam 17 as well as the laser weld seam 18 in a manner overlapping one another.

The first laser beam 7 as well as the second laser beam 19 and the laser beam 23 in the embodiment shown are guided onto the first welding flange 3 in a straight line. In addition, the third laser beam 22 as well as the laser beams 24 and 25 are guided onto the second welding flange 20 in a straight line. In an alternative embodiment the mentioned laser beams are guided onto the corresponding welding flanges by means of at least one deflection device. The deflection device can comprise a mirror and be arranged within the at least partially closed form.

In the embodiment shown, the first laser weld seam 8, the second laser weld seam 14 and the third laser weld seam 16 as well as the additional weld seams 15, 17 and 18 are formed in a straight line. In an alternative embodiment of the method, the respective laser beams can also be guided onto the first welding flange 3 and the second welding flange 20 in such a manner that the corresponding laser weld seams have a bent or curved form.

The second profile part 5 in the embodiment shown in FIG. 2 likewise comprises openings 26, 27 and 28. Through at least one of the openings 26, 27 and 28 an additional laser beam, which is not shown in FIG. 2 for the sake of clarity, can be guided onto the third welding flange 6 subject to the formation of at least one additional laser weld seam between the first welding flange 3 and the third welding flange 6.

The body parts 1 shown in FIG. 1 and FIG. 2 are more preferably suitable for installation in a motor vehicle, wherein the first profile part 2 and/or the second profile part 5 can be a part of an A-pillar of the motor vehicle. Alternatively, the first profile part 2 and/or the second profile part 5 can be a part of a C or D-pillar of the motor vehicle.

Figure 3:
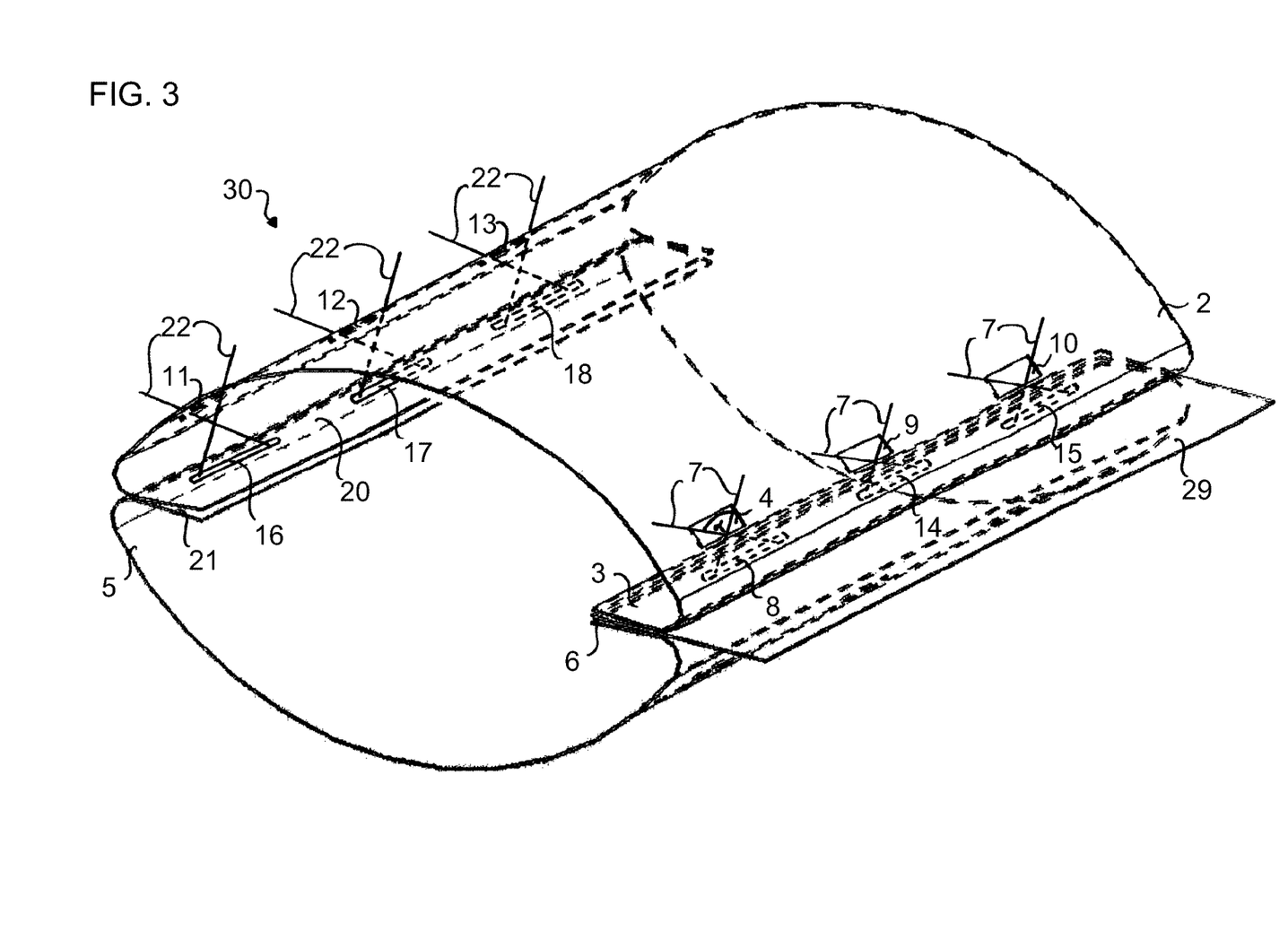
FIG. 3 shows a method for producing a body part of a vehicle according to a third embodiment of the invention.

FIG. 3 shows a method for producing a body part 30 of a vehicle according to a third embodiment of the invention. Components with the same functions as in the preceding figures are marked with the same reference characters and are not explained in more detail in the following.

The method according to the third embodiment is similar to the first embodiment shown in FIG. 1, wherein in contrast with the embodiment shown in FIG. 1, a flange 29 in form of a plate or plate strip is additionally arranged between the first welding flange 3 and the third welding flange 6. The flange 29 on executing the welding operation is likewise welded together, i.e. the first laser weld seam 8 and the second laser weld seam 14 and the laser weld seam 15 form between the first welding flange 3, the third welding flange 6 and the flange 29.

The flange 29 serves as mounting flange for a seal not shown in FIG. 3 for example in form of a sealing rubber for sealing the body part 30 against the entry of water and dirt.

In an alternative embodiment which is not shown at least one of the profile parts 2 and 5 instead of the separate flange 29 can have a one-sided lateral projection for example in form of a side wall. This lateral projection in turn serves as mounting flange for a seal.

Figure 4:
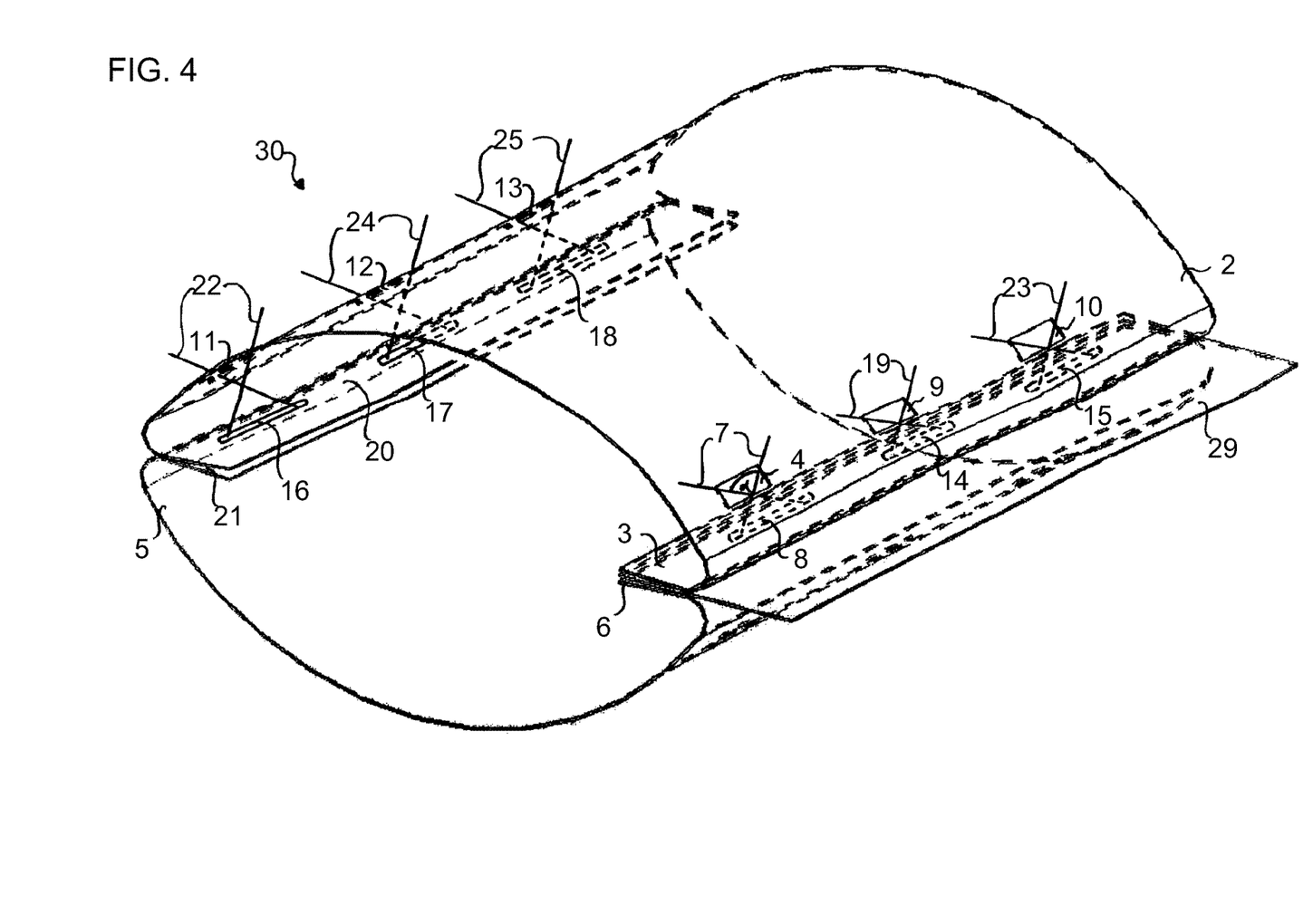
FIG. 4 shows a method for producing a body part of a vehicle according to a fourth embodiment of the invention.

FIG. 4 shows a method for producing a body part 30 of a vehicle according to a fourth embodiment of the invention. Components with the same functions as in the preceding figures are marked with the same reference characters and are not explained in more detail in the following.

The method according to the fourth embodiment is similar to the second embodiment shown in FIG. 2, wherein in contrast with the second embodiment shown in FIG. 2 a flange 29 in form of a plate or plate strip is additionally arranged between the first welding flange 3 and the third welding flange 6. During the welding operation the flange 29 is likewise welded, i.e. the first laser weld seam 8 and the second laser weld seam 14 and the laser weld seam 15 form between the first welding flange 3, the third welding flange 6 and the flange 29.

The flange 29 serves as mounting flange for a seal not shown in FIG. 4, for example, in form of a sealing rubber, for sealing the body parts against the entry of water and dirt.

In an alternative embodiment which is not shown at least one of the profile parts 2 and 5 instead of the separate flange 29 can comprise a one-sided lateral projection, for example in form of a side wall. This lateral projection, in turn serves as mounting flange for a seal.

Figure 5A:
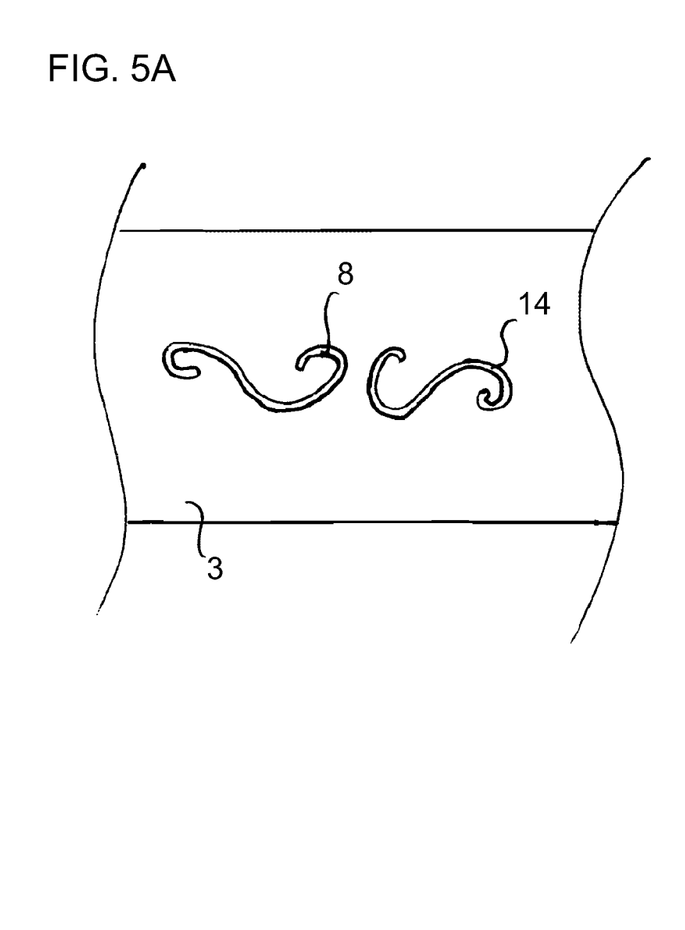
FIG. 5a shows a first form of a laser weld seam.

FIG. 5A shows a first form of a laser weld seam. Components with the same functions as in the preceding figures are marked with the same reference characters and are not explained in more detail in the following.

To this, FIG. 5A shows a part region of the first welding flange 3 as well as the first laser weld seam 8 and the second laser weld seam 14. The first laser weld seam 8 and the second laser weld seam 14 are arranged separated from each other and each have a curved, partially intertwined form.

Figure 5B:
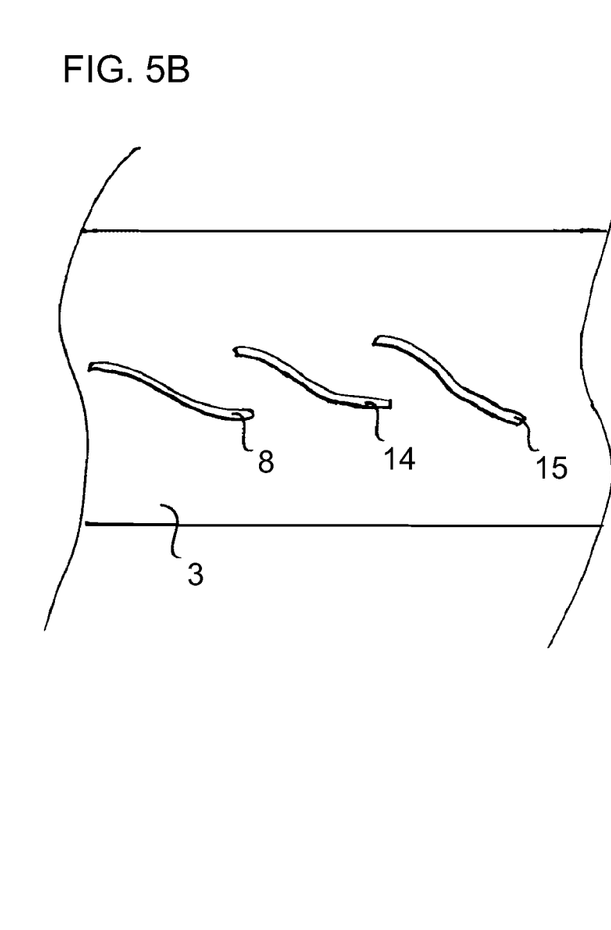
FIG. 5b shows a second form of a laser weld seam.

FIG. 5B shows a second form of a laser weld seam. Components with the same function as in the preceding figures are marked with the same reference characters and are not explained in more detail in the following.

To this, FIG. 5B shows a part region of the first welding flange 3 as well as the first laser weld seam 8, the second laser weld seam 14 and the laser weld seam 15. The first laser weld seam 8, the second laser weld seam 14 and the laser weld seam 15 are arranged separated from one another and each has a bent, wave-like form.

The additional laser weld seams not shown in FIG. 5A and FIG. 5B can also have the forms shown in the two figures.

Through suitable selection of the form of the laser weld seams the energy input in the respective welding flanges or the respective profile parts connected with the welding operation can be advantageously reduced or introduced in a controlled manner such that the heating of the welding flanges or profile parts takes place as homogenously as possible. Because of this, temperature-dependent mechanical stresses within the welding flanges are reduced or buckling of the welding flanges or of parts of the welding flanges connected with the heating is reduced.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A body part of a vehicle, comprising:
a first profile part with a first portion, at least one first welding flange adjacent the first portion, and a first opening formed in the first portion, wherein the at least one first welding flange forms a first U-shaped profile with the first portion;
a second profile part with a second portion and at least one third welding flange adjacent the second portion such that the at least one third welding flange and the second portion form a second U-shaped profile;
wherein the at least one first welding flange is arranged at least partially on the at least one third welding flange subject to form an at least partially closed form of the body part between the first profile part and the second profile part,
wherein the at least one first welding flange and the at least one third welding flange are arranged within the at least partially closed form;
wherein the first opening is adapted to guide a first laser beam through the first opening onto the at least one first welding flange within the at least partially closed form of the body part; and
at least one first laser weld seam joining the at least one first welding flange and the at least one third welding flange and formed by the first laser beam guided through the first opening,
wherein the first U-shaped profile is formed by a first leg and a second leg, the first opening being on the first leg and the first welding flange forming the second leg.

2. The body part according to claim 1, wherein the vehicle is a motor vehicle and the first profile part is part of an A-pillar of the motor vehicle.

3. The body part according to claim 1, wherein the vehicle is a motor vehicle and the second profile part is part of an A-pillar of the motor vehicle.

4. The body part according to claim 1, wherein each of the first U-shaped profile and the second U-shaped profile has an open end in a common direction within the at least partially closed form of the body part.

5. The body part according to claim 1, wherein a first laser weld seam of the at least one first laser weld seam extends in a straight line.

6. The body part according to claim 1, wherein a first laser weld seam of the at least one first laser weld seam extends in a curved line.

* * * * *